US005947591A

United States Patent [19]

Katsumata et al.

[11] Patent Number: 5,947,591

[45] Date of Patent: Sep. 7, 1999

[54] VEHICULAR LAMP

[75] Inventors: Toshiyuki Katsumata; Yasuo Ozawa, both of Shimizu, Japan

[73] Assignee: Koito Manufacturing Co., Ltd., Tokyo, Japan

[21] Appl. No.: 08/855,290

[22] Filed: May 13, 1997

[30] Foreign Application Priority Data

May 13, 1996 [JP] Japan .................................... 8-117483

[51] Int. Cl.[6] ............................ F21V 31/02; B60Q 1/068

[52] U.S. Cl. .......................... 362/267; 362/310; 362/374; 362/375; 362/523

[58] Field of Search .................................... 362/267, 374, 362/375, 310, 523, 546

[56] References Cited

U.S. PATENT DOCUMENTS

| | | | |
|---|---|---|---|
| 4,907,134 | 3/1990 | Mori | 362/523 |
| 5,363,283 | 11/1994 | Shirai et al. | 362/523 |
| 5,735,596 | 4/1998 | Daumueller | 362/267 |

*Primary Examiner*—Alan Cariaso
*Attorney, Agent, or Firm*—Koda & Androlia

[57] ABSTRACT

In a vehicular lamp, a front lens is mechanically fastened to a lamp body by a fastening device formed astride the boundary between the seal groove-defining wall and the front lens during insertion of a seal leg portion of the front lens into a seal groove with a sealant provided therein. The fastening device includes stopping protrusions provided on the seal groove-defining wall of the lamp body and tongue-shaped elastic pieces that are provided on the seal leg portion and have openings. As the seal leg portion is inserted into the seal groove to mount the front lens to the lamp body, the tongue-shaped elastic pieces are pressed against the stopping protrusions and thereby elastically deformed outward. The stopping protrusions thereby smoothly engage with the openings so that the seal leg portion will not fall apart from the seal groove, without requiring a plate spring.

12 Claims, 5 Drawing Sheets

PRIOR ART

VEHICULAR LAMP

BACKGROUND OF THE INVENTION

1. Field of the invention

The present invention relates to a fastening structure between the lamp body and the lens of a vehicular lamp.

2. Description of the Related Art

In a conventional motor vehicle headlamp, as shown in FIG. 6, a front lens 3 is integrally mounted on a front portion of a lamp body 1 that has a reflector 2 disposed inside. A sealant 5 is provided in a seal groove 4 formed in a front opening portion of the lamp body, and a seal leg portion 6 formed on a periphery of the front lens 3 is inserted into the seal groove 4. The seal groove 4 is thus sealed. The front lens 3 and the lamp body 1 are fastened to each other by a plate spring 7 disposed astride a seal groove defining-wall 4*a* and a projected portion 6*a* of the front lens 3.

This conventional vehicular headlamp has problems as follows. Since the front lens 3 is fastened to the lamp body 1 by using the plate spring 7, the number of component parts of the lamp is correspondingly increased. Furthermore, during the assembly of the lamp, the procedure of fitting the plate spring 7 must be performed after the mounting of the front lens 3 on the lamp body 1, which means a correspondingly reduced workability.

SUMMARY OF THE INVENTION

Accordingly, it is an object of the present invention to provide a vehicular lamp that enables a lens to be fastened to a lamp body without using a plate spring.

According to an aspect of the present invention, there is provided a vehicular lamp comprising a lamp body having a front opening portion in which a light source and a reflector are disposed; a lens mounted on the front opening portion; a water-tight device for maintaining water-tightness between the lamp body and the lens; and a fixing device for fixing the lens to the lamp body. The fixing device includes a first stopping device provided on the lens and a second stopping device provided on the lamp. The first stopping device and the second stopping device are engageable with each other to fix the lens to the lamp body.

According to another aspect of the present invention, there is provided a vehicular lamp comprising a lamp body having a front opening portion whose peripheral portion has a groove capable of receiving a sealant; a lens having a seal leg portion that is formed in a peripheral portion of the lens. The seal leg portion is insertable into the groove with the sealant provided therein. A fastening device for fastening the lens to lamp body extends over a portion in or near the front opening portion and a portion in or near the peripheral portion of the lens. The fastening device includes a stopping protrusion provided in or near the front opening portion, and a tongue-like elastic piece that is provided in or near the peripheral portion of the lens and has an opening portion engageable with the stopping protrusion.

In either of the vehicular lamps described above, the lens and the lamp body fixed to each other by engagement between the first stopping device or the tongue-like elastic piece having an opening and the second stopping device or the stopping protrusion so that the lens will not fall apart from the lamp body, in addition to the water-tight sealing therebetween. This firm engagement between the lens and the lamp body can readily be accomplished during operation of mounting the lens to the lamp body without requiring an additional member such as a plate spring, thus improving workability during assembly. In addition, since an additional fastening member such as a plate spring is unnecessary, the number of component parts of the lamp is correspondingly reduced and the lamp structure is accordingly simplified.

The vehicular lamp of the present invention may be applied to a so-called movable unit-type lamp wherein a reflector is formed inside the lamp body, and the lamp body and the unitary reflector form a lamp body-reflector unit, and wherein the lamp body-reflector unit is tiltable in up-down and right-left directions relative to a lamp housing by an aiming mechanism disposed between the lamp body-reflector unit and the lamp housing to be fixed to a vehicle body.

The lamp body may be formed of a harder material than the front lens. More specifically, the lamp body may be formed of a hard synthetic resin such as a bulk molding compound or the like, and the lens may be formed of a synthetic resin, such as polycarbonate, that more readily elastically deforms than the material of the lamp body. The use of a relatively hard material for the lamp body will prevent deformation of the reflector, thereby contributing to appropriate light distribution. Moreover, the use of a relatively soft material for the lens facilitates engagement of the stopping members since the stopping member of the lens will readily deform during the process of mounting the lens to the lamp body, thereby improving assembly workability.

The opening of the tongue-like elastic piece formed in or near the peripheral portion of the lens may be greater in size than the stopping protrusion provided in or near the front opening portion. This construction further facilitates engagement between the tongue-like elastic piece and the stopping protrusion. Furthermore, a gap formed between the opening portion and the stopping protrusion eliminates the danger of creating unexpected stress in the engaging portions between the lens and the lamp body.

A small protrusion may be provided on a distal end surface of the seal leg portion of the lens, at a position corresponding to the opening portion of the tongue-like elastic piece. The small protrusion is capable of abutting against a bottom surface of the groove for forming a gap between the stopping protrusion and the opening portion. By adjusting or reducing the amount of protrusion of the small protrusion, the pressing contact between the engaging portions (the opening portion of the tongue-like elastic piece and the stopping protrusion) can easily be avoided.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
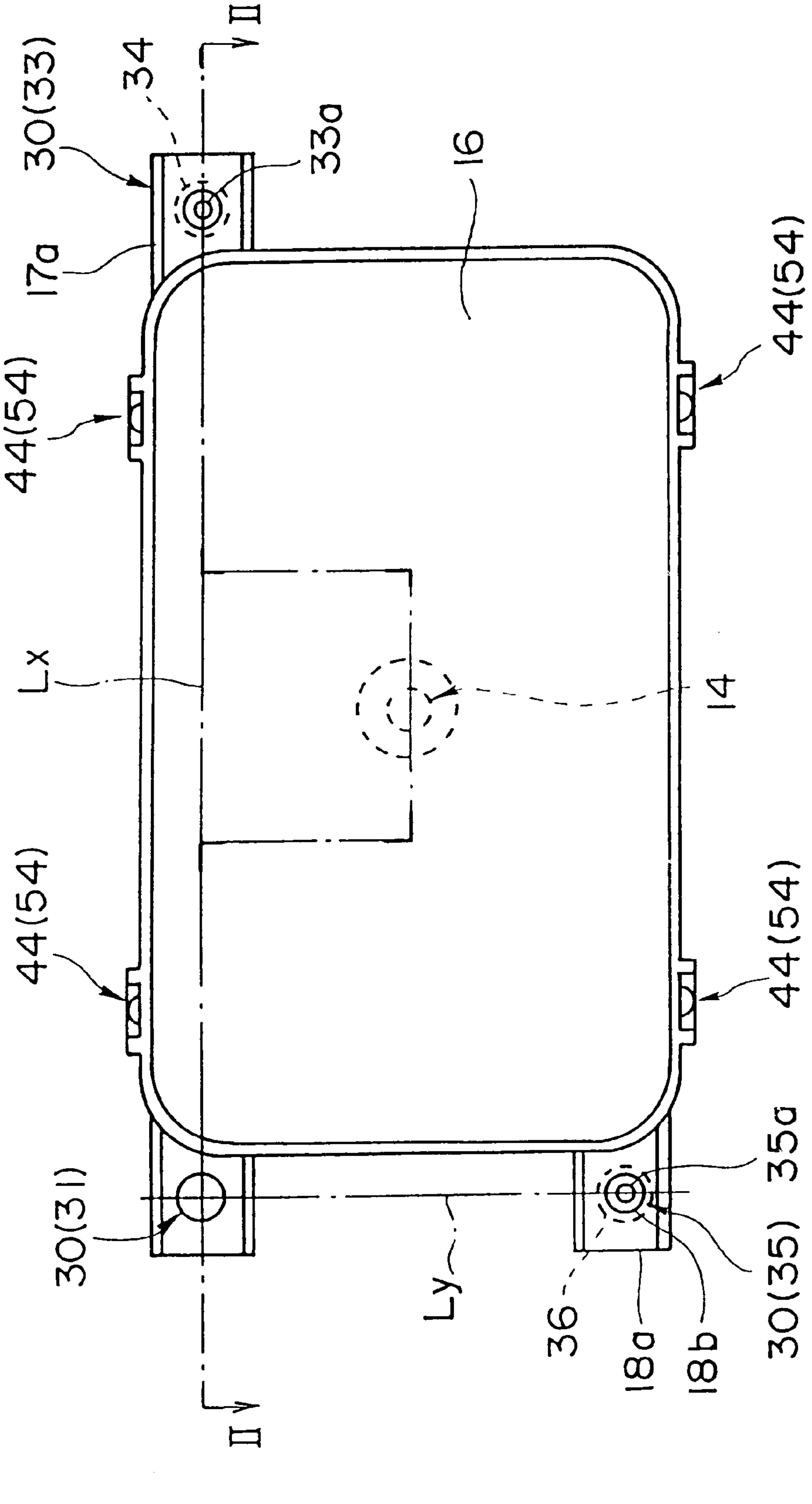
FIG. 1 is a front elevation of a motor vehicle headlamp according to a preferred embodiment of the present invention.

A preferred embodiment of the present invention will be described in detail hereinafter with reference to the accompanying drawings.

FIGS. 1 to 5 illustrate a motor vehicle headlamp according to a preferred embodiment of the invention. A lamp body 11 is formed of a hard synthetic resin (for example, a fiber-reinforced plastic (FRP) such as a bulk molding compound(BMC)) into a container-like shape, unitarily with a parabolic reflector 12 that is formed on an inner surface of the lamp body 11 by aluminum vapor deposition. A rearmost portion of the lamp body 11 has a lamp insert hole 13 into which a bulb 14 is inserted. A front lens 16 formed of a relatively flexible synthetic resin (for example, polycarbonate) is fitted to a front opening portion of the lamp body 11, thus integrated with the lamp body 11 to form a headlamp unit (hereinafter, referred to as "lamp unit") 10.

The front opening portion of the lamp body 11 of the lamp unit 10 has a seal groove 40 that extends along an entire peripheral edge of the front opening portion. A rear-facing peripheral portion of the front lens 16 has a seal leg portion 50 that extends along an entire peripheral edge thereof. The engaging portions (the seal leg portion 50 and the seal groove 40) of the front lens 16 and the lamp body 11 are fixed and sealed to each other by applying an sealant 42 into the seal groove 40, and inserting the seal leg portion 50 into the seal groove 40.

Figure 3:
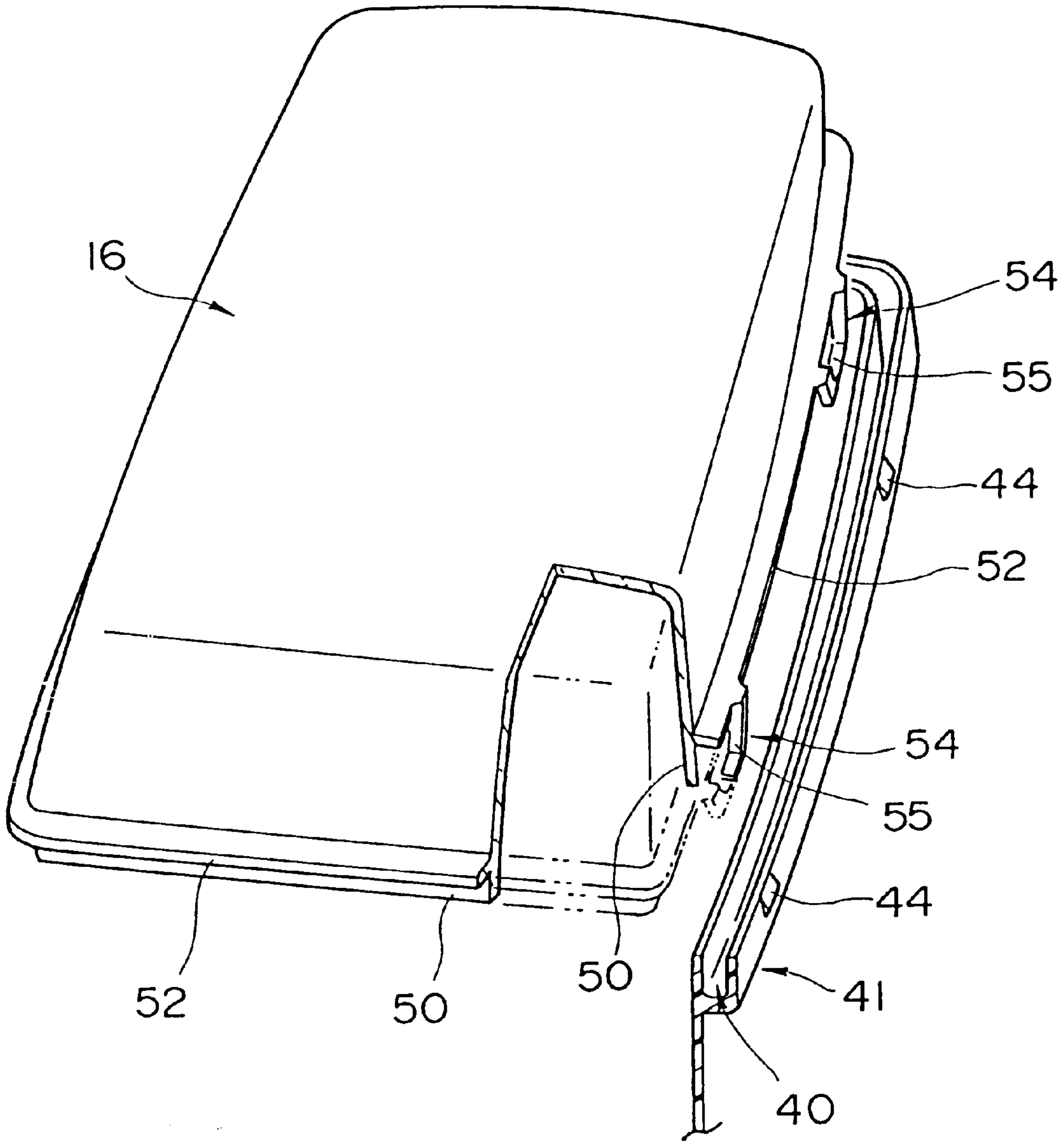
FIG. 3 is a perspective view of the headlamp, showing engaging portions of a lens and a lamp body of the headlamp.
Figure 4:
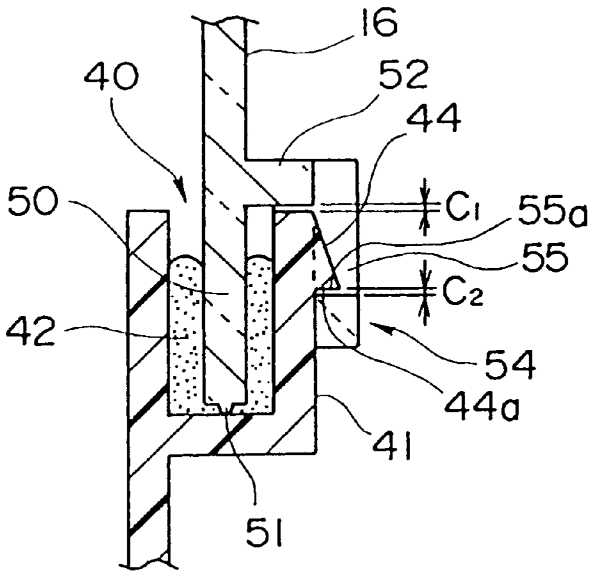
FIG. 4 is an enlarged view of engaging portions shown in FIG. 3.

The front lens 16 and the lamp body 11 are also mechanically fastened to each other at four positions, more specifically, two positions on each of upper and lower sides of the lamp unit 10. As shown in FIGS. 3 and 4, a seal groove-defining wall 41 of the lamp body 11 has four stopping protrusions 44 on the outside surface thereof. The front lens 16 has a flange-like ridge portion 52 that extends along a base end of the seal leg portion 50 over the entire periphery of the front lens 16. The ridge portion 52 has four tongue-shaped elastic pieces 54 engageable with the seal groove-defining wall 41. The elastic pieces 54 are formed at positions corresponding to the stopping protrusions 44. Each elastic piece 54 has an opening portion 55 engageable with the corresponding stopping protrusion 44 of the lamp body 11.

Figure 5:
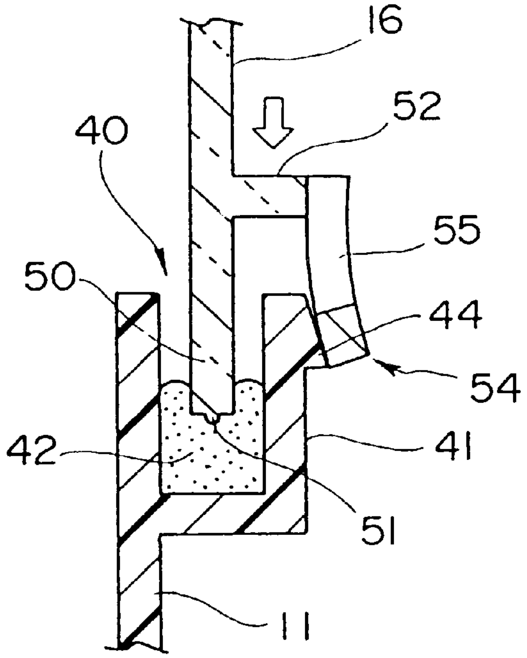
FIG. 5 illustrates how a stopping protrusion engages with an opening portion of a tongue-like elastic piece.
Figure 6:
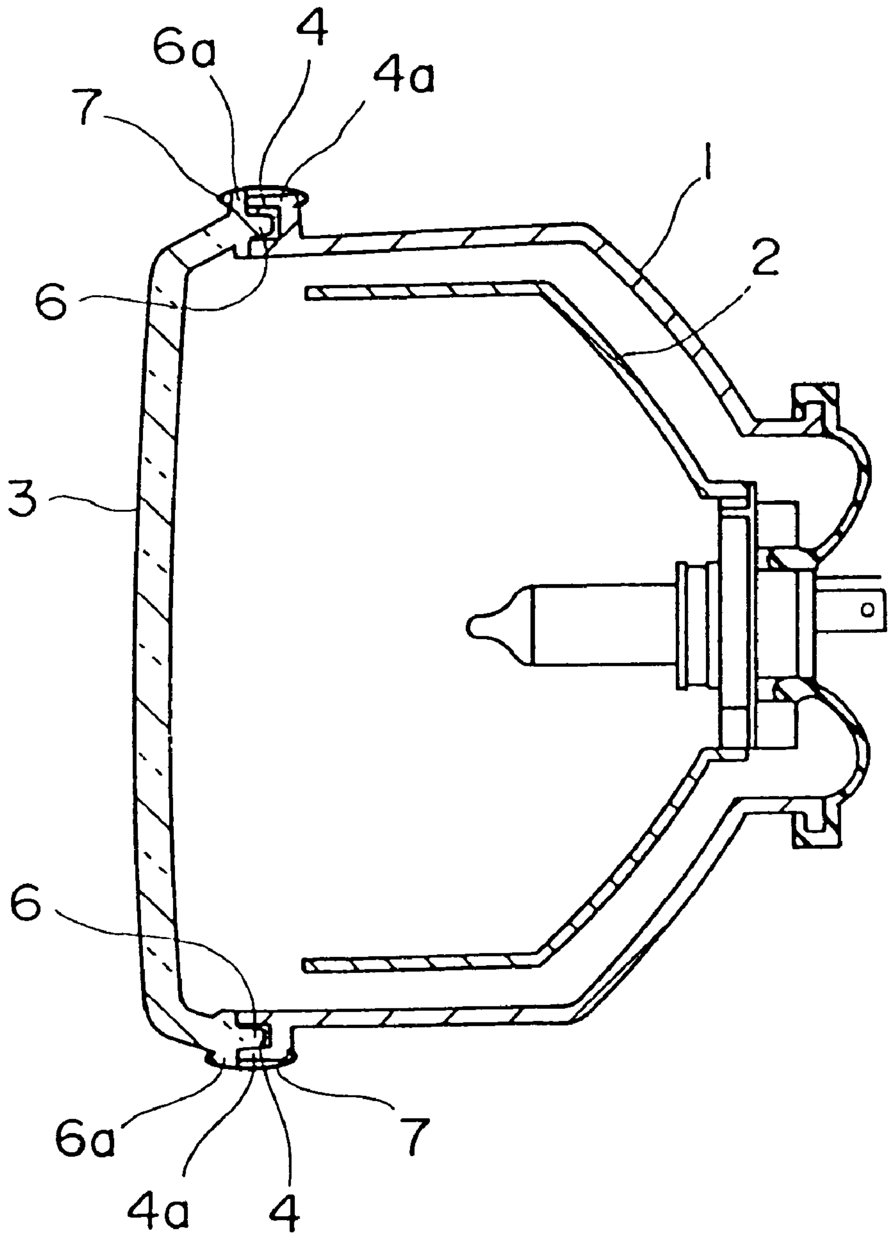
FIG. 6 is a sectional view of a conventional motor vehicle headlamp.

With this construction, as the seal leg portion 50 is inserted into the seal groove 40 with the sealant 42 provided therein as indicated by an arrow in FIG. 5, the tongue-shaped elastic pieces 54 are pressed against the stopping protrusions 44 and thereby elastically deformed outward. Thus, the stopping protrusions 44 smoothly engage with the opening portions 55 (see FIG. 4), so that the seal leg portion 50 of the front lens 16 will not fall apart from the seal groove 40.

The openings of the opening portions 55 have a greater size than the stopping protrusions, to enable smooth engagement between the stopping protrusions 44 and the opening portions 55. When the stopping protrusions 44 are engaged with the opening portions 55, small gaps $C_1$, $C_2$ are formed between the stopping protrusions 44 and the opening portions 55 (see FIG. 4), thereby avoiding occurrence of unexpected stress in the engaging portions (the tongue-shaped elastic pieces 54 and the stopping protrusions 44) of the front lens 16 and the lamp body 11.

If stress is present in a portion of the front lens 16 or the lamp body 11 (for example, if a lower end 44*a* (shown in FIG. 4) of a stopping protrusion 44 were pressed against a lower edge surface 55*a* of the opening portion 55, stress would occur and remain in the seal groove-defining wall 41 and the tongue-shaped elastic pieces 54), such a stress remaining portion is subject to cracking promoted by deposition of an organic solvent contained in, for example, gasoline or wax. Gasoline may accidentally fall on a headlamp during fuel refilling operation, and wax could deposit on a headlamp during car washing or waxing. If such an incident occurs on a stress remaining portion, the corrosion of the synthetic material by the organic solvent will promote cracking in the stress remaining portion. However, according to this embodiment, the engaging portions are free from such a danger of cracking since stress will not remain in the engaging structure where the small gaps $C_1$, $C_2$ are formed between the stopping protrusions 44 and the opening portions 55.

Gap-adjusting small protrusions 51 are formed on a distal end surface of the seal leg portion 50, at positions corresponding to the openings of the tongue-shaped elastic pieces 54. The gap-adjusting small protrusions 51 ensure formation of the gaps $C_1$, $C_2$ between the stopping protrusions 44 and the opening portions 55. More specifically, if the gaps $C_1$, $C_2$ will not form (that is, if a stopping protrusion 44 will contact the opening portion 55 when engaged) because the amount of protrusion of the small protrusion 51 is excessively great, the small protrusion 51 may be appropriately cut to reduce the amount of protrusion. By thus adjusting the amount of protrusion, the formation of the gaps $C_1$, $C_2$ can be ensured (that is, adjustment can be made such that no stress will remain in the engaging portions).

Figure 2:
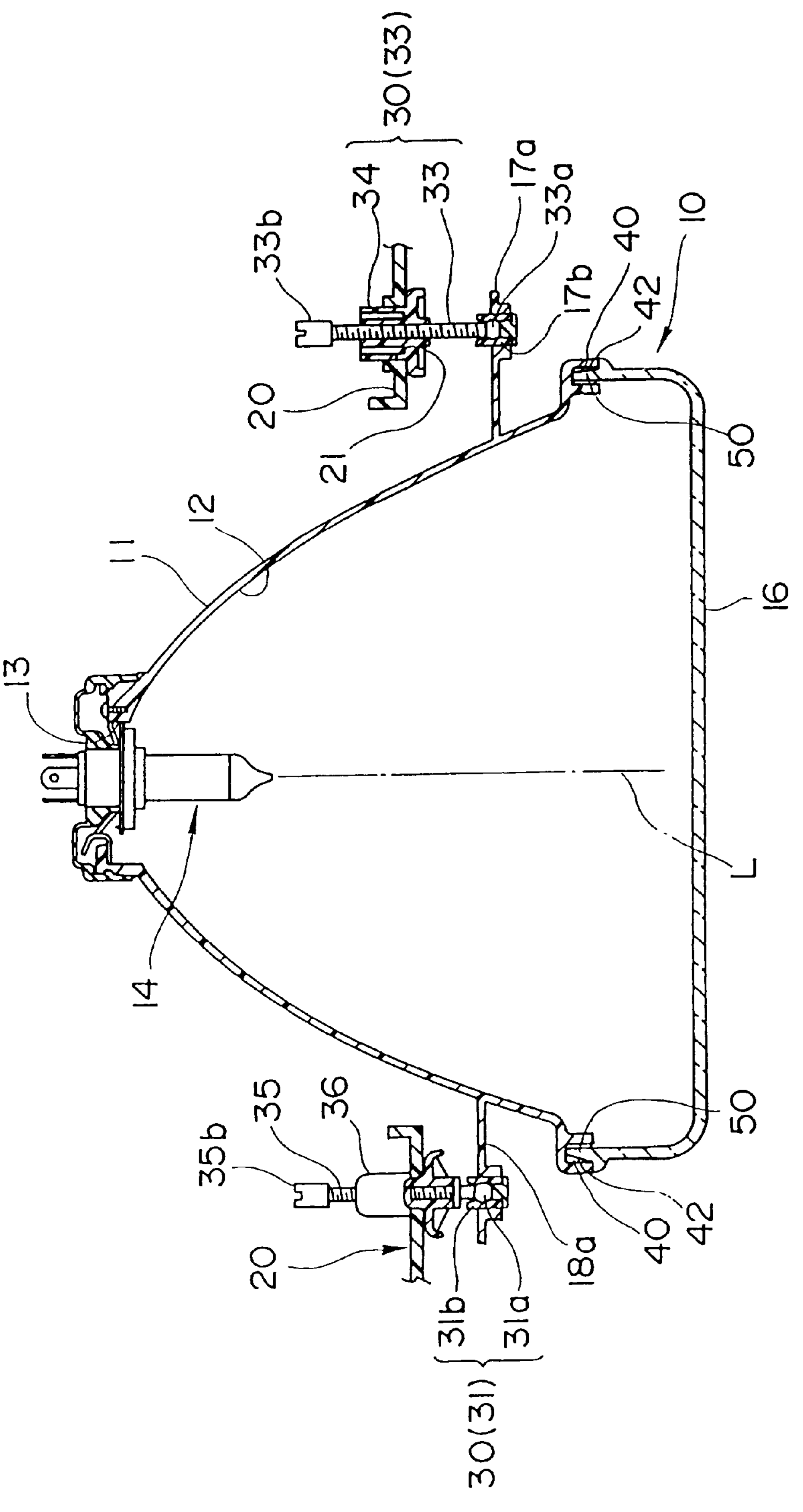
FIG. 2 is a horizontal sectional view of the headlamp taken on a plane II—II of FIG. 1.

Referring to FIG. 2, a lamp housing 20 formed of a relatively hard synthetic resin (for example, polypropylene) is disposed at a back side of the lamp unit 10. Provided between the lamp unit 10 and the lamp housing 20 is an aiming mechanism 30 for adjusting the inclination of the lamp unit 10 relative to lamp housing 20.

More specifically, the lamp unit 10 is supported tiltably at a front portion of the lamp housing 20 by the aiming mechanism 30, which is made up of a ball joint 31, a right-left aiming screw 33 and an up-down aiming screw 35. A ball portion 31*a* of the ball joint 31 is fixed to and supported by the lamp housing 20. A bearing 31*b* engageable with the ball portion 31*a* is fixed to a bracket protruding sideways from a back side of the lamp unit 10. Thereby, the lamp unit 10 is pivotable on the ball joint 31. The aiming screws 33, 35 are screwed into and rotatably supported by screw support nuts 34, 36, respectively, fixed to nut insert holes 21 of the lamp housing 20. The screw support nuts 33, 35 are formed of a relatively soft synthetic resin such as nylon.

The aiming screws 33, 35 have tool engaging portions 33*b*, 35*b* on rear ends thereof for engaging with a tool such as a screw driver. Thereby, it is possible to rotate the aiming screws 33, 35 from the back side of the lamp housing 20. By rotating the aiming screws 33, 35, the aiming screws move relative to the nuts 34, 36 while the bearings 17*b*, 18*b* engaged with the ball portions 33*a*, 35*a* at the distal ends of the screws move together with the screws 33, 35, thus changing the inclination of the lamp unit 10.

More specifically, the support point of the lamp unit 10 by the right-left aiming screw 33 (that is, the engagement portion between the ball portion 33*a* of the aiming screw 33 and the bearing 17*b* fixed to the lamp unit 10) is located on a horizontal axis Lx that intersects the illumination axis L of the headlamp (see FIG. 2) at a substantially right angle and passes through the ball joint 31. The supporting point of the lamp unit 10 by the up-down aiming screw 35 (that is, the engagement portion between the ball portion 35*a* of the aiming screw 35 and the bearing 18*b* fixed to the lamp unit 10) is located on a vertical axis Ly that intersects the illumination axis L of the headlamp (see FIG. 2) at a substantially right angle and passes through the ball joint 31. Therefore, when the aiming screw 33 is turned, the aiming screw 33 moves relative to the lamp housing 20 and the lamp unit 10 inclines about the vertical axis Ly, thus changing the inclination of the lamp unit 10 relative to the lamp housing 20 in the right-left direction, that is, the illumination angle of the headlamp in the right-left direction. When the aiming screw 35 is turned, the aiming screw 35 moves relative to the lamp housing 20 and the lamp unit 10 inclines about the horizontal axis Lx, thus changing the inclination of the lamp unit 10 relative to the lamp housing 20 in the up-down direction, that is, the illumination angle of the headlamp in the up-down direction. Thus, the inclination of the lamp unit 10, that is, the illumination angle of the headlamp, can be adjusted by using the two aiming screws 33, 35.

Although the above embodiment has been described in conjunction with the movable unit type headlamp in which the lamp unit 10 including the lamp body 11 and the reflector 12 formed unitarily with the inner peripheral surface of the lamp body 11 is tiltably supported on the lamp housing 20, the embodiment may be applied to the fastening of a front lens to a lamp body of a movable reflector type headlamp in which a reflector disposed inside the lamp body is supported tiltably to the lamp body.

Furthermore, although the embodiment has been described in conjunction with the fastening of the front lens to the lamp body, the present invention is not limited to a headlamp but may be widely applied to the fastening of a front lens to a lamp body of other type of vehicular lamp.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the appended claims.

The entire disclosure of Japanese Patent Application No. Hei 8-117483 filed on May 13, 1996 including the specification, drawings and abstract is incorporated herein by reference in its entirety.

What is claimed is:

1. A vehicular lamp comprising:

a lamp body having a front opening portion;

a light source disposed in the lamp body;

a reflector formed on an inner surface of the lamp body;

a lens mounted on the front opening portion; and a fastening means comprising a first stopping means provided on the lens including a ridged portion and an elastic piece, and a second stopping means formed on the outside of the lamp body; and wherein the first stopping means is inwardly engaged with the second stopping means to fix the lens to the lamp body; and when the first stopping means is engaged with the second stopping means, the first stopping means is elastically deformed outwardly.

2. A vehicular lamp according to claim 1, wherein a groove formed in a peripheral portion of the front opening portion of the lamp body, and a leg portion formed in a peripheral portion of the lens, the leg portion insertable into the groove, and wherein the lens and the lamp body are fixed to each other by inserting the leg portion into the groove with a sealant provided therein.

3. A vehicular lamp according to claim 1, wherein the fastening means is formed at a plurality of positions on each of the lens and the lamp body, each of the position on one of the lens and the lamp body facing a corresponding position on the other one of the lens and the lamp body, and wherein the second stopping means provided on the lamp body has a stopping protrusion, and the elastic piece of the first stopping means has an opening portion engageable with the stopping protrusion.

4. A vehicular lamp according to claim 3, wherein when the stopping protrusion and the opening portion are engaged, a small gap is formed between the stopping protrusion and the opening portion.

5. A vehicular lamp according to claim 3, wherein a small protrusion is formed on a distal end surface of the leg portion of the lens, and is capable of adjusting the size of a gap formed between the stopping protrusion and the opening portion.

6. A vehicular lamp comprising:

a lamp body having a front opening portion whose peripheral portion has a groove capable of receiving a sealant;

a lens having a seal leg portion that is formed in a peripheral portion of the lens, the seal leg portion being insertable into the groove with the sealant provided therein; and fastening means extending over a portion in or near the front opening portion and a portion in or near the peripheral portion of the lens, for fastening the lens to the lamp body, the fastening means including a stopping protrusion provided in or near the front opening portion, and a tongue-like elastic piece that is provided in or near the peripheral portion of the lens and has an opening portion engageable with the stopping protrusion; and wherein the opening of the tongue-like elastic piece formed in or near the peripheral portion of the lens is greater in size than the stopping protrusion provided in or near the front opening portion.

7. A vehicular lamp according to claim 1, wherein the lamp body and a unitary reflector form lamp body-reflector unit, and wherein the lamp body-reflector unit is tiltable in up-down and right-left directions relative to a lamp housing by an aiming mechanism disposed between the lamp body-reflector unit and the lamp housing to be fixed to a vehicle body.

8. A vehicular lamp according to claim 6, wherein said reflector is formed inside the lamp body, and a lamp body and the unitary reflector form lamp body-reflector unit, and wherein the lamp body-reflector unit is tiltable in up-down and right-left directions relative to a lamp housing by an aiming mechanism disposed between the lamp body-reflector unit and the lamp housing to be fixed to a vehicle body.

9. A vehicular lamp according to claim 1, wherein the lamp body is formed of a harder material than the front lens.

10. A vehicular lamp according to claim 6, wherein the lamp body is formed of a harder material than the front lens.

11. A vehicular lamp according to claim 8, wherein the lamp body is formed of a hard synthetic resin comprising a bulk molding compound, and the lens is formed of a synthetic resin, comprising a polycarbonate that more readily elastically deforms than the material of the lamp body.

12. A vehicular lamp comprising:

a lamp body having a front opening portion whose peripheral portion has a groove capable of receiving a sealant;

a lens having a seal leg portion that is formed in a peripheral portion of the lens, the seal leg portion being insertable into the groove with the sealant provided therein;

fastening means extending over a portion in or near the front opening portion and a portion in or near the peripheral portion of the lens, for fastening the lens to the lamp body, the fastening means including a stopping protrusion provided in or near the front opening portion, and a tongue-like elastic piece that is provided in or near the peripheral portion of the lens and has an opening portion engageable with the stopping protrusion; and a small protrusion provided on a distal end surface of the leg portion, at a position corresponding to the opening portion of the tongue-like elastic piece, the small protrusion being capable of abutting against a bottom surface of the groove for forming a gap between the stopping protrusion and the opening protrusion.

* * * * *